United States Patent
Abedini et al.

(10) Patent No.: US 12,063,694 B2
(45) Date of Patent: Aug. 13, 2024

(54) FULL DUPLEX RANDOM ACCESS CHANNEL COMMUNICATION

(71) Applicant: QUALCOMM Incorporated, San Diego, CA (US)

(72) Inventors: Navid Abedini, Basking Ridge, NJ (US); Qian Zhang, Basking Ridge, NJ (US); Kapil Gulati, Belle Mead, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/444,145

(22) Filed: Jul. 30, 2021

(65) Prior Publication Data
US 2023/0029663 A1    Feb. 2, 2023

(51) Int. Cl.
*H04W 74/08*      (2009.01)
*H04W 56/00*      (2009.01)
*H04W 74/0833*   (2024.01)

(52) U.S. Cl.
CPC ..... *H04W 74/0841* (2013.01); *H04W 56/001* (2013.01); *H04W 74/0891* (2013.01)

(58) Field of Classification Search
CPC ......... H04W 74/0841; H04W 74/0891; H04W 74/0833; H04W 74/08; H04W 56/001; H04W 56/0015
See application file for complete search history.

(56) References Cited

U.S. PATENT DOCUMENTS

| | | |
|---|---|---|
| 11,596,004 B2 | 2/2023 | Zhang et al. |
| 11,665,742 B2 | 5/2023 | Zhang et al. |
| 2014/0044108 A1* | 2/2014 | Earnshaw ............. G01S 5/0063 370/336 |
| 2018/0042052 A1* | 2/2018 | Harjula ............. H04W 74/0833 |
| 2020/0296635 A1* | 9/2020 | Rastegardoost ...... H04W 72/23 |
| 2020/0374937 A1* | 11/2020 | Kim ..................... H04W 28/16 |
| 2021/0051707 A1* | 2/2021 | Rastegardoost ..... H04B 17/318 |
| 2021/0144742 A1* | 5/2021 | Jeon ....................... H04L 41/06 |
| 2021/0352737 A1 | 11/2021 | Yang et al. |

(Continued)

FOREIGN PATENT DOCUMENTS

| | | |
|---|---|---|
| WO | 2020060358 A1 | 3/2020 |
| WO | 2020060360 A1 | 3/2020 |

(Continued)

OTHER PUBLICATIONS

International Search Report and Written Opinion—PCT/US2022/073950—ISA/EPO—dated Sep. 23, 2022.

*Primary Examiner* — Sudesh M Patidar
(74) *Attorney, Agent, or Firm* — QUALCOMM Incorporated

(57) ABSTRACT

Various aspects of the present disclosure generally relate to wireless communication. In some aspects, a network node may receive a control message including a field for a timing offset, wherein the timing offset is applicable to a subset of a set of random access channel occasions. The network node may transmit a random access channel preamble in a time resource corresponding to the timing offset and associated with a random access channel occasion of the set of random access channel occasions. Numerous other aspects are described.

30 Claims, 10 Drawing Sheets

800 ⟶

810 — Receive a control message including a field for a timing offset, wherein the timing offset is applicable to a subset of a set of random access channel occasions 820 — Transmit a random access channel preamble in a time resource corresponding to the timing offset and associated with a random access channel occasion of the set of random access channel occasions

(56) References Cited

U.S. PATENT DOCUMENTS

| | | |
|---|---|---|
| 2021/0352745 A1 | 11/2021 | Yang et al. |
| 2022/0095387 A1* | 3/2022 | Qi ..................... H04W 74/0841 |
| 2022/0225424 A1* | 7/2022 | Wang .................. H04L 43/0864 |
| 2022/0225436 A1* | 7/2022 | Lin .................... H04W 74/0866 |
| 2022/0263570 A1* | 8/2022 | Wang ................ H04W 56/0045 |

FOREIGN PATENT DOCUMENTS

| | | |
|---|---|---|
| WO | WO-2020202190 A1 * | 10/2020 |
| WO | 2021142807 A1 | 7/2021 |
| WO | WO-2022030851 A1 * | 2/2022 |

\* cited by examiner

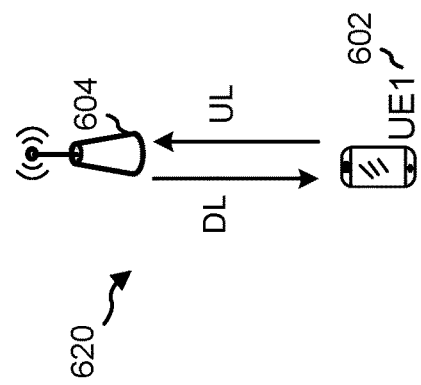
FIG. 6B
FIG. 6C
FIG. 6A

FULL DUPLEX RANDOM ACCESS CHANNEL COMMUNICATION

FIELD OF THE DISCLOSURE

Aspects of the present disclosure generally relate to wireless communication and to techniques and apparatuses for full duplex random access channel communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include receiving a control message including a field for a timing offset, wherein the timing offset is applicable to a subset of a set of random access channel occasions. The method may include transmitting a random access channel preamble in a time resource corresponding to the timing offset and associated with a random access channel occasion of the set of random access channel occasions.

Some aspects described herein relate to a method of wireless communication performed by a network node. The method may include receiving a message identifying an association of a plurality of synchronization signal blocks to a plurality of sets of random access channel occasions, wherein each set of random access channel occasions of the plurality of sets of random access channel occasions is associated with one or more synchronization signal blocks of the plurality of synchronization signal blocks. The method may include transmitting using a random access channel occasion, of a set of random access channel occasions of the plurality of sets of random access channel occasions, in connection with the association of the plurality of synchronization signal blocks to the plurality of sets of random access channel occasion.

Some aspects described herein relate to a network node for wireless communication. The network node may include a memory and one or more processors coupled to the memory. The one or more processors may be configured to receive a control message including a field for a timing offset, wherein the timing offset is applicable to a subset of a set of random access channel occasions. The one or more processors may be configured to transmit a random access channel preamble in a time resource corresponding to the timing offset and associated with a random access channel occasion of the set of random access channel occasions.

Some aspects described herein relate to a network node for wireless communication. The network node may include a memory and one or more processors coupled to the memory. The one or more processors may be configured to receive a message identifying an association of a plurality of synchronization signal blocks to a plurality of sets of random access channel occasions, wherein each set of random access channel occasions of the plurality of sets of random access channel occasions is associated with one or more synchronization signal blocks of the plurality of synchronization signal blocks. The one or more processors may be configured to transmit using a random access channel occasion, of a set of random access channel occasions of the plurality of sets of random access channel occasions, in connection with the association of the plurality of synchronization signal blocks to the plurality of sets of random access channel occasion.

Some aspects described herein relate to a non-transitory computer-readable medium that stores a set of instructions for wireless communication by a network node. The set of instructions, when executed by one or more processors of the network node, may cause the network node to receive a control message including a field for a timing offset, wherein the timing offset is applicable to a subset of a set of random access channel occasions. The set of instructions, when executed by one or more processors of the network node, may cause the network node to transmit a random access channel preamble in a time resource corresponding to the timing offset and associated with a random access channel occasion of the set of random access channel occasions.

Some aspects described herein relate to a non-transitory computer-readable medium that stores a set of instructions for wireless communication by a network node. The set of instructions, when executed by one or more processors of the network node, may cause the network node to receive a message identifying an association of a plurality of synchronization signal blocks to a plurality of sets of random access channel occasions of the plurality of sets of random access channel occasions is associated with one or more synchronization signal blocks of the plurality of synchronization signal blocks. The set of instructions, when executed by one or more processors of the network node, may cause the network node to transmit using a random access channel occasion, of a set of random access channel occasions of the plurality of sets of random access channel occasions, in connection with the association of the plurality of synchronization signal blocks to the plurality of sets of random access channel occasion.

Some aspects described herein relate to an apparatus for wireless communication. The apparatus may include means for receiving a control message including a field for a timing offset, wherein the timing offset is applicable to a subset of a set of random access channel occasions. The apparatus may include means for transmitting a random access channel preamble in a time resource corresponding to the timing offset and associated with a random access channel occasion of the set of random access channel occasions.

Some aspects described herein relate to an apparatus for wireless communication. The apparatus may include means for receiving a message identifying an association of a plurality of synchronization signal blocks to a plurality of sets of random access channel occasions, wherein each set of random access channel occasions of the plurality of sets of random access channel occasions is associated with one or more synchronization signal blocks of the plurality of synchronization signal blocks. The apparatus may include means for transmitting using a random access channel occasion, of a set of random access channel occasions of the plurality of sets of random access channel occasions, in connection with the association of the plurality of synchronization signal blocks to the plurality of sets of random access channel occasion.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module- component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6A-6C are diagrams illustrating an example of full duplex (FD) communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
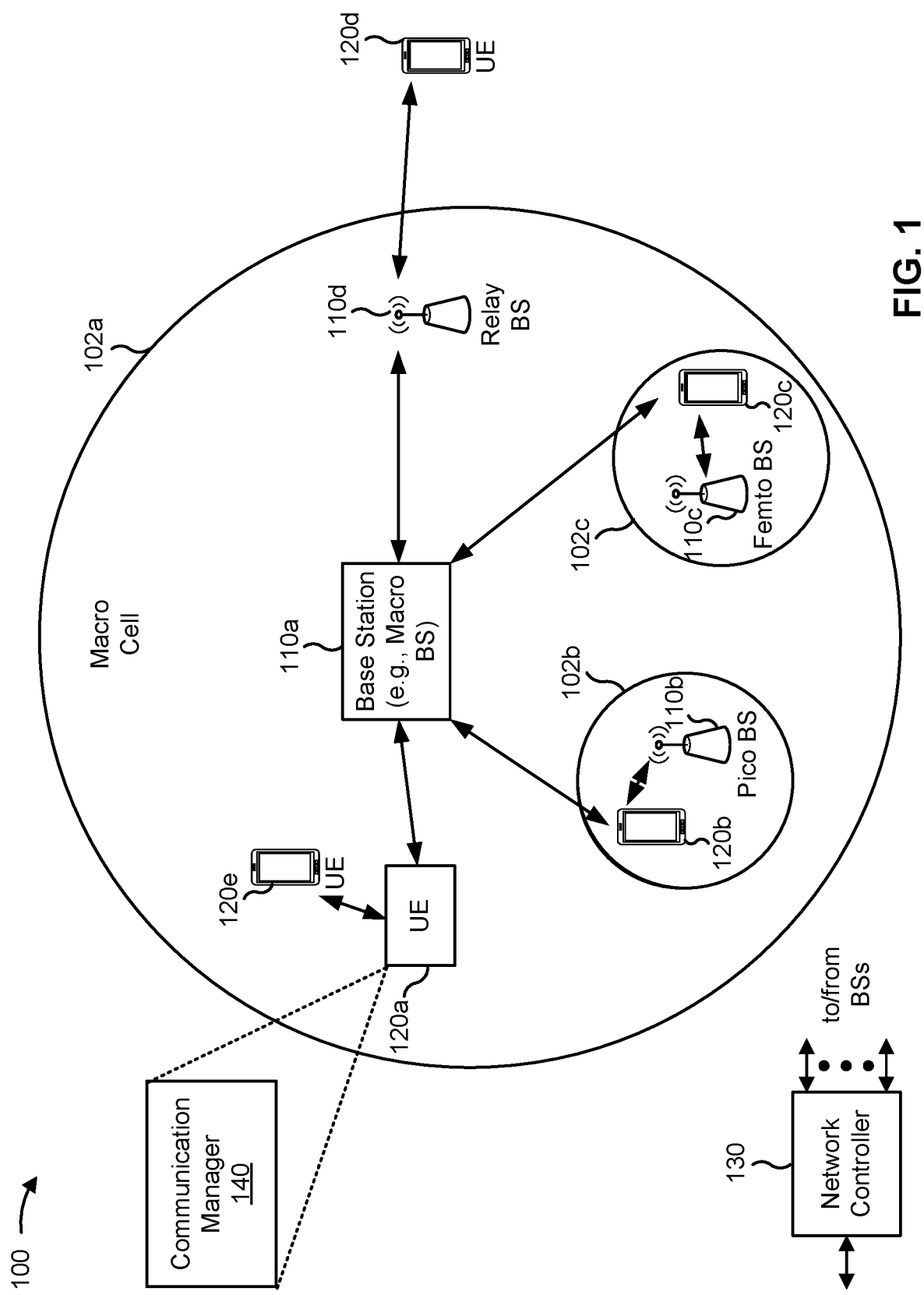
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network node, such as the UE 120, may include a communication manager 140. As described in more detail elsewhere herein, the communication manager 140 may receive a control message including a field for a timing offset, wherein the timing offset is applicable to a subset of a set of random access channel occasions; and transmit a random access channel preamble in a time resource corresponding to the timing offset and associated with a random access channel occasion of the set of random access channel occasions. The communication manager 140 may receive a message identifying an association of a plurality of synchronization signal blocks to a plurality of sets of random access channel occasions, wherein each set of random access channel occasions of the plurality of sets of random access channel occasions is associated with one or more synchronization signal blocks of the plurality of synchronization signal blocks; and transmit using a random access channel occasion, of a set of random access channel occasions of the plurality of sets of random access channel occasions, in connection with the association of the plurality of synchronization signal blocks to the plurality of sets of random access channel occasion. Additionally, or alternatively, the communication manager 140 may perform one or more other operations described herein.

As indicated above, FIG. 1 is provided as an example. Other examples may differ from what is described with regard to FIG. 1.

Figure 2:
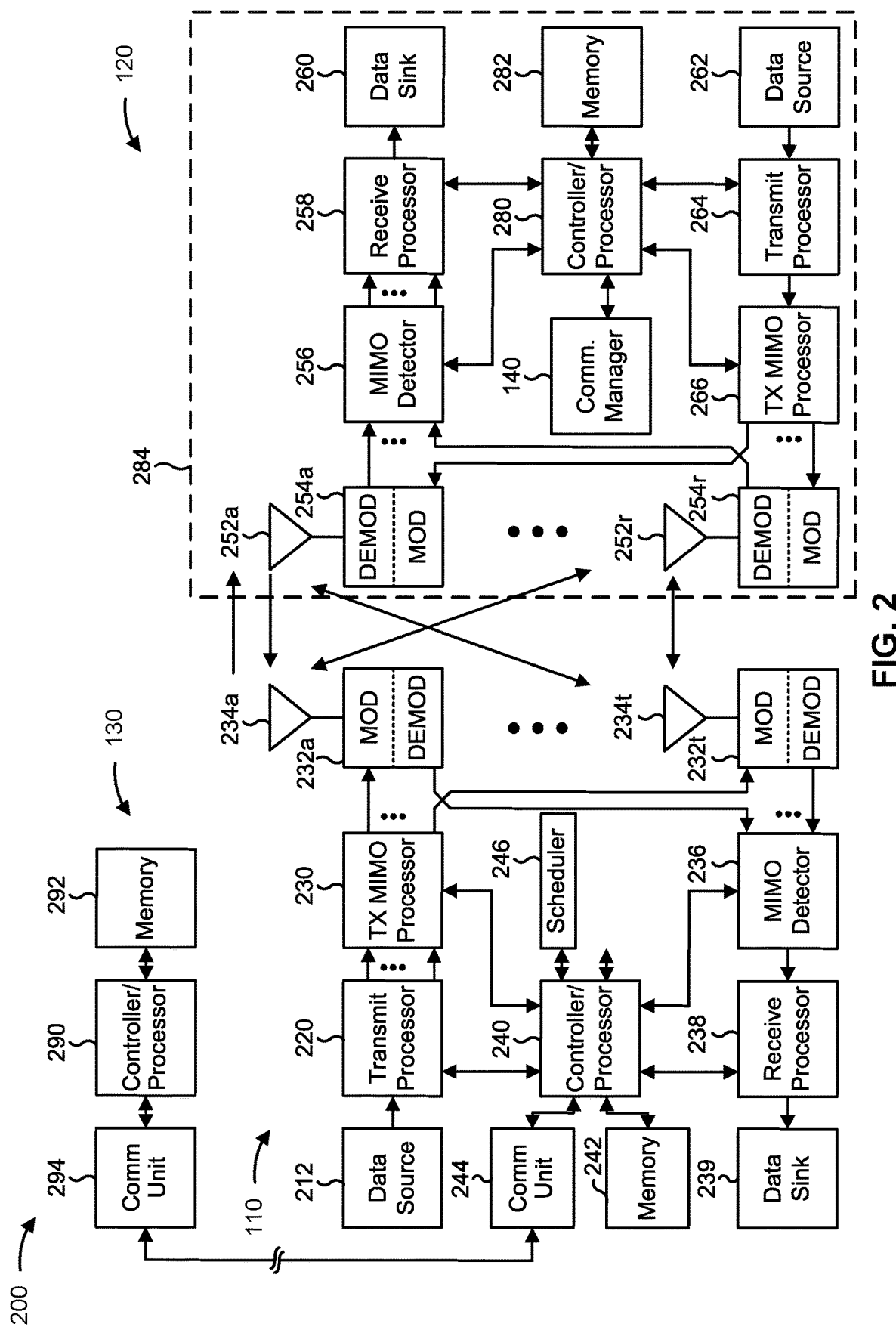
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-10).

The controller/processor 240 of the base station 110, the controller/processor 280 of the UE 120, and/or any other component(s) of FIG. 2 may perform one or more techniques associated with full duplex random access channel communication, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a network node, such as a UE 120, includes means for receiving a control message including a field for a timing offset, wherein the timing offset is applicable to a subset of a set of random access channel occasions; and/or means for transmitting a random access channel preamble in a time resource corresponding to the timing offset and associated with a random access channel occasion of the set of random access channel occasions. In some aspects, the network node includes means for receiving a message identifying an association of a plurality of synchronization signal blocks to a plurality of sets of random access channel occasions, wherein each set of random access channel occasions of the plurality of sets of random access channel occasions is associated with one or more synchronization signal blocks of the plurality of synchronization signal blocks; and/or means for transmitting using a random access channel occasion, of a set of random access channel occasions of the plurality of sets of random access channel occasions, in connection with the association of the plurality of synchronization signal blocks to the plurality of sets of random access channel occasion. In some aspects, the means for the network node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
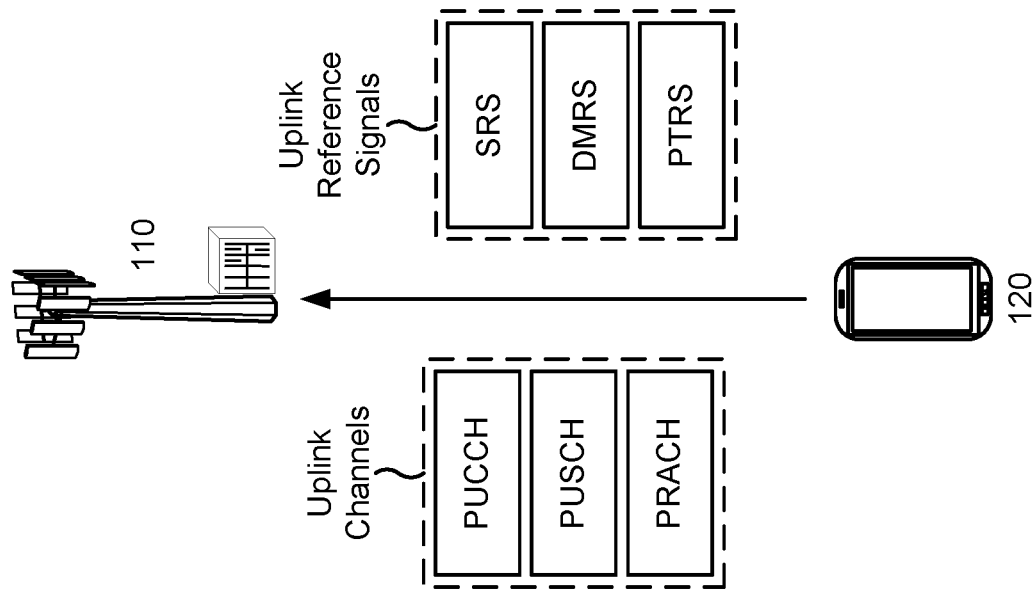
FIG. 3 is a diagram illustrating an example of physical channels and reference signals in a wireless network, in accordance with the present disclosure.
Figure 3:
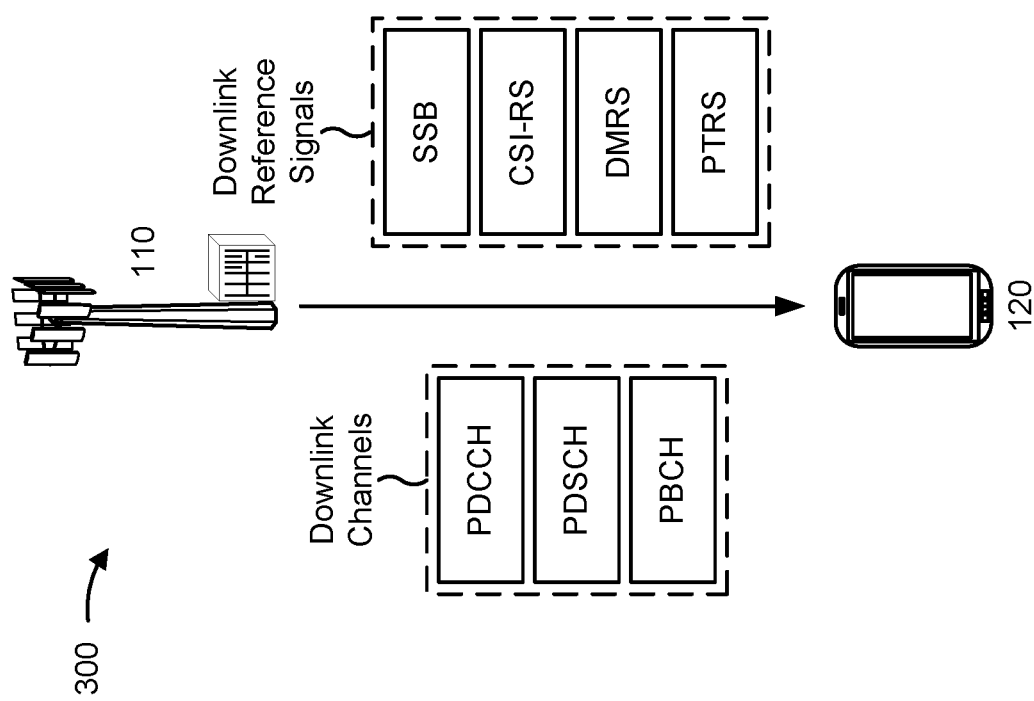

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. The UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. The base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. The base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

The base station 110 may schedule different signals on overlapping time resources with random access channel (RACH) occasions (ROs). For example, a full duplex base station 110 may configure or schedule an SSB, PDCCH, PDSCH, or CSI-RS, among other examples on communication resources overlapping with ROs, as described in more detail herein.

As indicated above, FIG. 3 is provided as an example. Other examples may differ from what is described with regard to FIG. 3.

Figure 4:
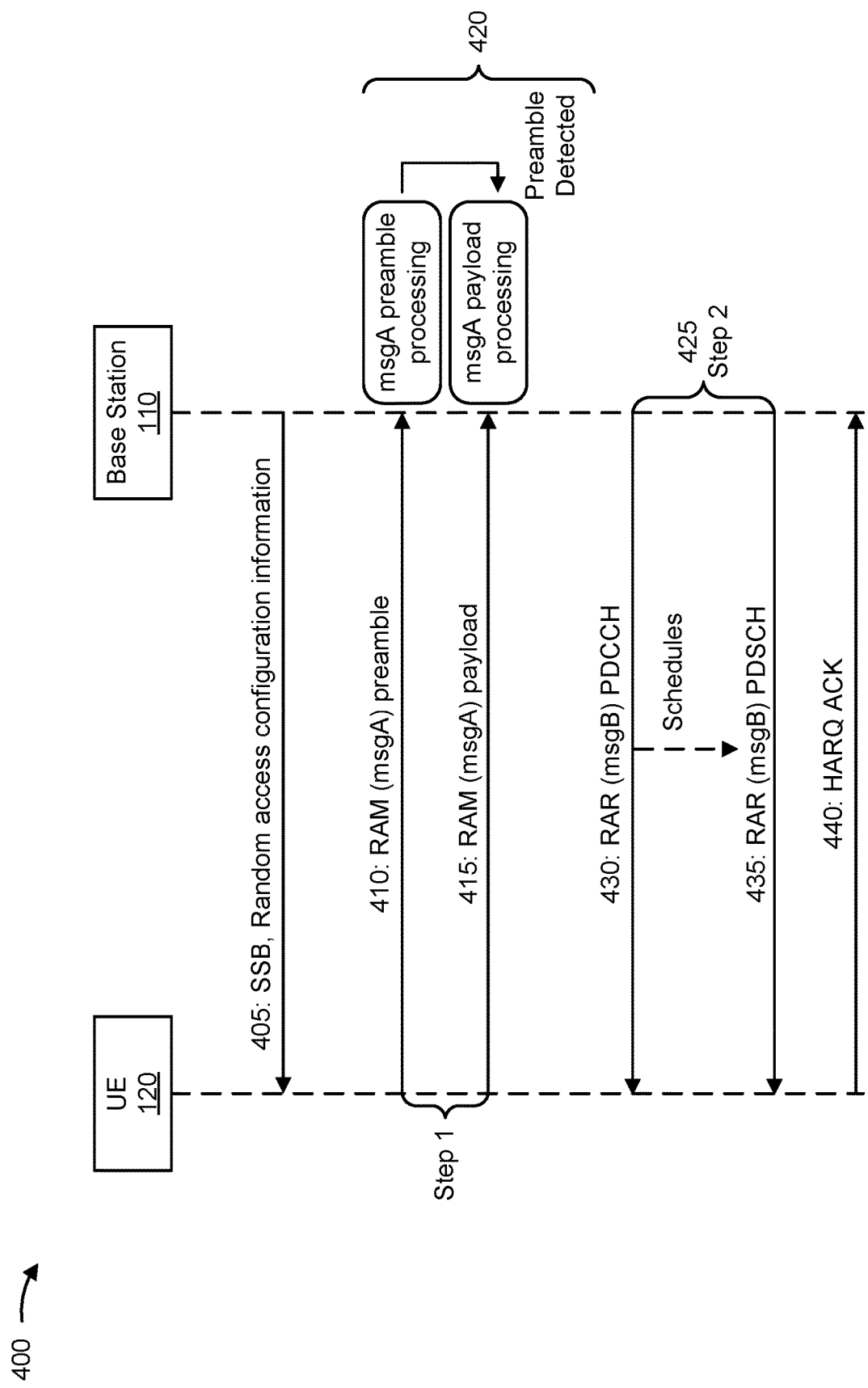
FIG. 4 is a diagram illustrating an example of a two-step random access procedure, in accordance with the present disclosure.

FIG. 4 is a diagram illustrating an example 400 of a two-step random access procedure, in accordance with the present disclosure. As shown in FIG. 4, a base station 110 and a UE 120 may communicate with one another to perform the two-step random access procedure.

As shown by reference number 405, the base station 110 may transmit, and the UE 120 may receive, one or more SSBs and random access configuration information. The random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a PDCCH order message that triggers a RACH procedure, such as for contention-free random access. The random access configuration information may include one or more parameters to be used in the two-step random access procedure, such as one or more parameters for transmitting a random access message (RAM) and/or receiving a random access response (RAR) to the RAM.

As shown by reference number 410, the UE 120 may transmit, and the base station 110 may receive, a RAM preamble. As shown by reference number 415, the UE 120 may transmit, and the base station 110 may receive, a RAM payload. As shown, the UE 120 may transmit the RAM preamble and the RAM payload to the base station 110 as part of an initial (or first) step of the two-step random access procedure. In some aspects, the RAM may be referred to as message A, msgA, a first message, or an initial message in a two-step random access procedure. Furthermore, in some aspects, the RAM preamble may be referred to as a message A preamble, a msgA preamble, a preamble, or a physical random access channel (PRACH) preamble, and the RAM payload may be referred to as a message A payload, a msgA payload, or a payload. In some aspects, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), and/or a physical uplink shared channel (PUSCH) transmission).

As shown by reference number 420, the base station 110 may receive the RAM preamble transmitted by the UE 120. If the base station 110 successfully receives and decodes the RAM preamble, the base station 110 may then receive and decode the RAM payload.

As shown by reference number 425, the base station 110 may transmit an RAR (sometimes referred to as an RAR message). As shown, the base station 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, and/or contention resolution information.

As shown by reference number 430, as part of the second step of the two-step random access procedure, the base station 110 may transmit a PDCCH communication for the RAR. The PDCCH communication may schedule a PDSCH communication that includes the RAR. For example, the PDCCH communication may indicate a resource allocation (e.g., in downlink control information (DCI)) for the PDSCH communication.

As shown by reference number 435, as part of the second step of the two-step random access procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 440, if the UE 120 successfully receives the RAR, the UE 120 may transmit a hybrid automatic repeat request (HARQ) acknowledgement (ACK).

As indicated above, FIG. 4 is provided as an example. Other examples may differ from what is described with regard to FIG. 4.

Figure 5:
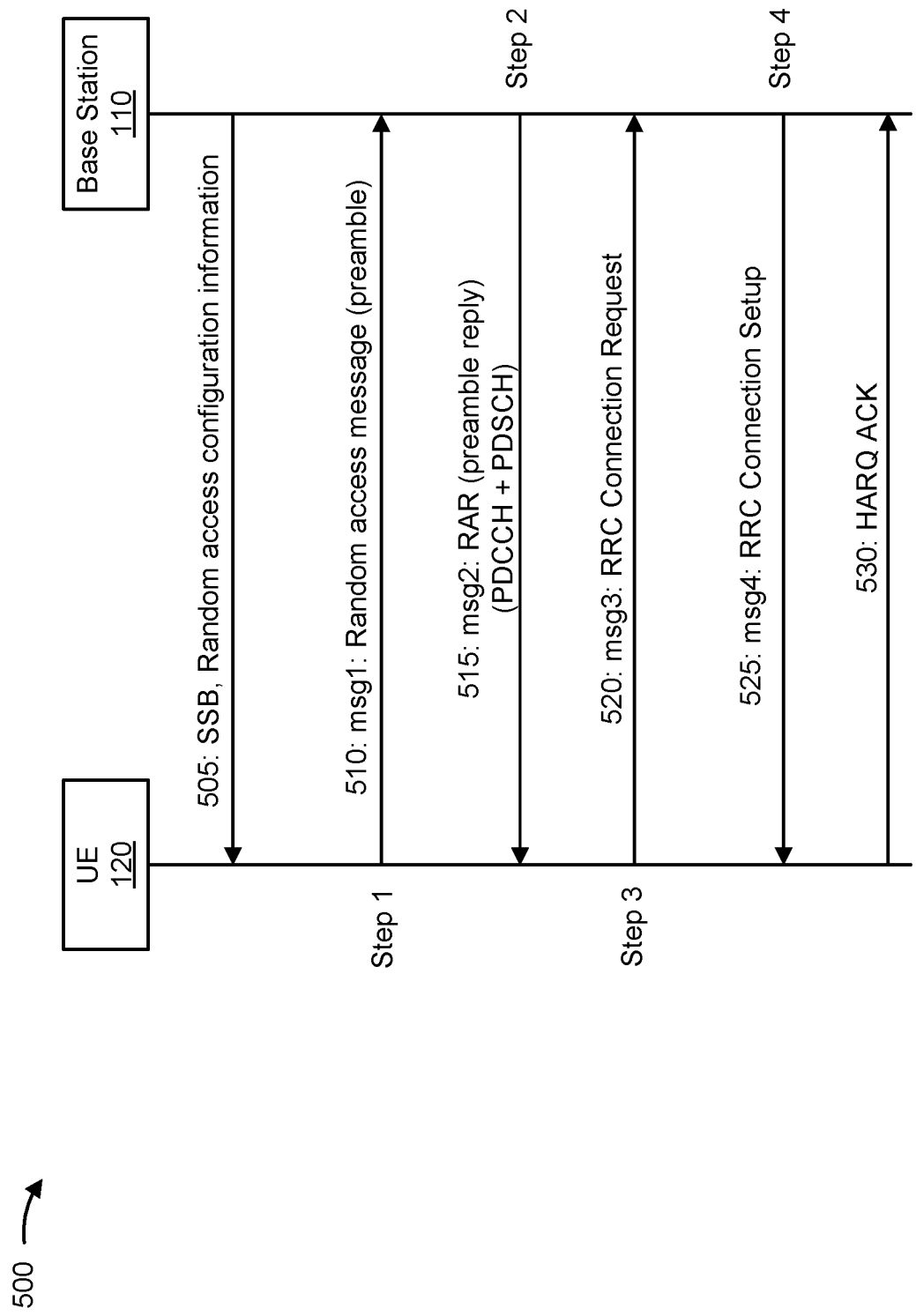
FIG. 5 is a diagram illustrating an example of a four-step random access procedure, in accordance with the present disclosure.

FIG. 5 is a diagram illustrating an example of a four-step random access procedure, in accordance with the present disclosure. As shown in FIG. 5, a base station 110 and a UE 120 may communicate with one another to perform the four-step random access procedure.

As shown by reference number 505, the base station 110 may transmit, and the UE 120 may receive, one or more SSBs and random access configuration information. In some aspects, the random access configuration information may be transmitted in and/or indicated by system information (e.g., in one or more SIBs) and/or an SSB, such as for contention-based random access. Additionally, or alternatively, the random access configuration information may be transmitted in a RRC message and/or a PDCCH order message that triggers a RACH procedure, such as for contention-free random access. The random access configuration information may include one or more parameters to be used in the random access procedure, such as one or more parameters for transmitting a RAM and/or one or more parameters for receiving an RAR.

As shown by reference number 510, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a four-step random access procedure. The random access message may include a random access preamble identifier.

As shown by reference number 515, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step random access procedure, the base station 110 may transmit the PDSCH communication for the RAR, as scheduled by the PDCCH communication. The RAR may be included in a MAC PDU of the PDSCH communication.

As shown by reference number 520, the UE 120 may transmit an RRC connection request message. The RRC connection request message may be referred to as message 3, msg3, MSG3, or a third message of a four-step random access procedure. In some aspects, the RRC connection request may include a UE identifier, UCI, and/or a PUSCH communication (e.g., an RRC connection request).

As shown by reference number 525, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 530, if the UE 120 successfully receives the RRC connection setup message, the UE 120 may transmit a HARQ ACK.

The RACH messages described herein may occur during ROs scheduled for a RACH procedure. For example, the base station 110 may schedule a set of ROs for the UE 120 to use to communicate with the base station 110 in connection with a RACH procedure. In some cases, the base station 110 may configure multiple sets of ROs for multiple different modes of operation, as described herein.

As indicated above, FIG. 5 is provided as an example. Other examples may differ from what is described with regard to FIG. 5.

FIGS. 6A-6C are diagrams illustrating examples 600, 610, 620 of full duplex (FD) communication in accordance with the present disclosure. The example 600 of FIG. 6A includes a UE1 602 and two base stations (e.g., TRPs) 604-1, 604-2, wherein the UE1 602 is sending UL transmissions to base station 604-1 and is receiving DL transmissions from base station 604-2. In the example 600 of FIG. 6A, FD is enabled for the UE1 602, but not for the base stations 604-1, 604-2. The example 610 of FIG. 6B includes two UEs, UE1 602-1 and UE2 602-2, and a base station 604, wherein the UE1 602-1 is receiving a DL transmission from the base station 604 and the UE2 602-2 is transmitting a UL transmission to the base station 604. In the example 610 of FIG. 6B, FD is enabled for the base station 604, but not for the UEs UE1 602-1 and UE2 602-2. The example 620 of FIG. 6C includes a UE1 602 and a base station 604, wherein the UE1 602 is receiving a DL transmission from the base station 604 and the UE1 602 is transmitting a UL transmission to the base station 604. In the example 620 of FIG. 6C, FD is enabled for both the UE1 602 and the base station 604.

In FD communications, in some cases, random access channel occasions may be configured within resources where other concurrent communications are occurring and/or configured to occur. For example, for an FD base station 604, the FD base station 604 may configure or schedule downlink signals (e.g., an SSB, a PDCCH, a PDSCH, or a CSI-RS, among other examples) on overlapping time resources as ROs. As another example, for an FD UE 602, the FD UE 602 may be configured to receive a downlink signal on overlapping time resources with which the FD UE 602 may transmit a RACH message (e.g., RACH message type-1, as described in more detail herein). As another example, for integrated access and backhaul (IAB) deployments, a distributed unit (DU) cell may have ROs that overlap with communications (e.g., transmission or reception) by a co-located mobile terminal (MT).

As described herein, a base station, such as the base station 604, may configure a set of ROs in which a RACH procedure (e.g., a two-step RACH procedure, a four-step RACH procedure, or another type of RACH procedure) may occur. In some cases, the base station may configure multiple sets of ROs for multiple different modes of operation. For example, the base station may configure a first set of ROs with a first configuration (e.g., a first set of resources or a first periodicity, among other examples) for a first mode of operation (e.g., half duplex (HD) RACH) and a second set of ROs with a second configuration (e.g., a second set of resources or a second periodicity, among other examples) for a second mode of operation (e.g., FD RACH). The base station may transmit multiple indications to configure the multiple sets of ROs (e.g., a first configuration message to indicate a first set of ROs for HD RACH and a second configuration message to indicate a second set of ROs for FD RACH).

As indicated above, FIGS. 6A-6C are provided as one or more examples. Other examples may differ from what is described with regard to FIGS. 6A-6C.

In FD or enhanced duplexing (ED) deployments, a network node (e.g., a UE or an IAB node) or a base station may have capabilities for concurrent transmission and/or reception. However, concurrent communications can result in interference, which may result in dropped communications or poor communication performance. Some RACH messages, such as a RACH msg1, do not include a timing advance (TA) value, which may prevent alignment of a timing of concurrent signals to avoid interference. For example, it may be beneficial to align a RACH reception (RX) timing with a downlink transmission (TX) timing at an FD base station. Similarly, it may be beneficial to align a RACH TX timing with a downlink RX timing at an FD UE (e.g., which may lack alignment when a non-zero value is configured for a timing advance offset, N_TAoffset). Similarly, it may be beneficial to align a RACH RX timing of a DU with a TX or RX timing of an MT at a network node with enhanced duplexing. Moreover, when multiple sets of ROs are configured, control messages for configuring RACH do not differentiate between the sets of ROs when configuring timing, which may prevent different sets of ROs from having different timing, which may result in interference conditions.

Additionally, when configuring ROs, a network node may receive a remaining minimum system information (RMSI) message that includes information identifying a mapping between SSBs and ROs. For example, the RMSI may include information identifying a list of transmitted SSBs and information configuring a set of ROs. However, the RMSI message only allows for a fixed mapping between the list of transmitted SSBs and the set of configured ROs. This may prevent association of subsets of SSBs to different sets of ROs.

Some aspects described herein enable full duplex (or enhanced duplex) RACH communication. For example, some aspects may enable differentiated timing adjustment for RACH preambles associated with different sets of ROs. Additionally, or alternatively, some aspects enable differentiated association between SSBs and different sets of ROs. In this way, a network node enables reduced interference in FD or ED operations, thereby improving communication performance or reducing dropped communications, among other examples.

Figure 7:
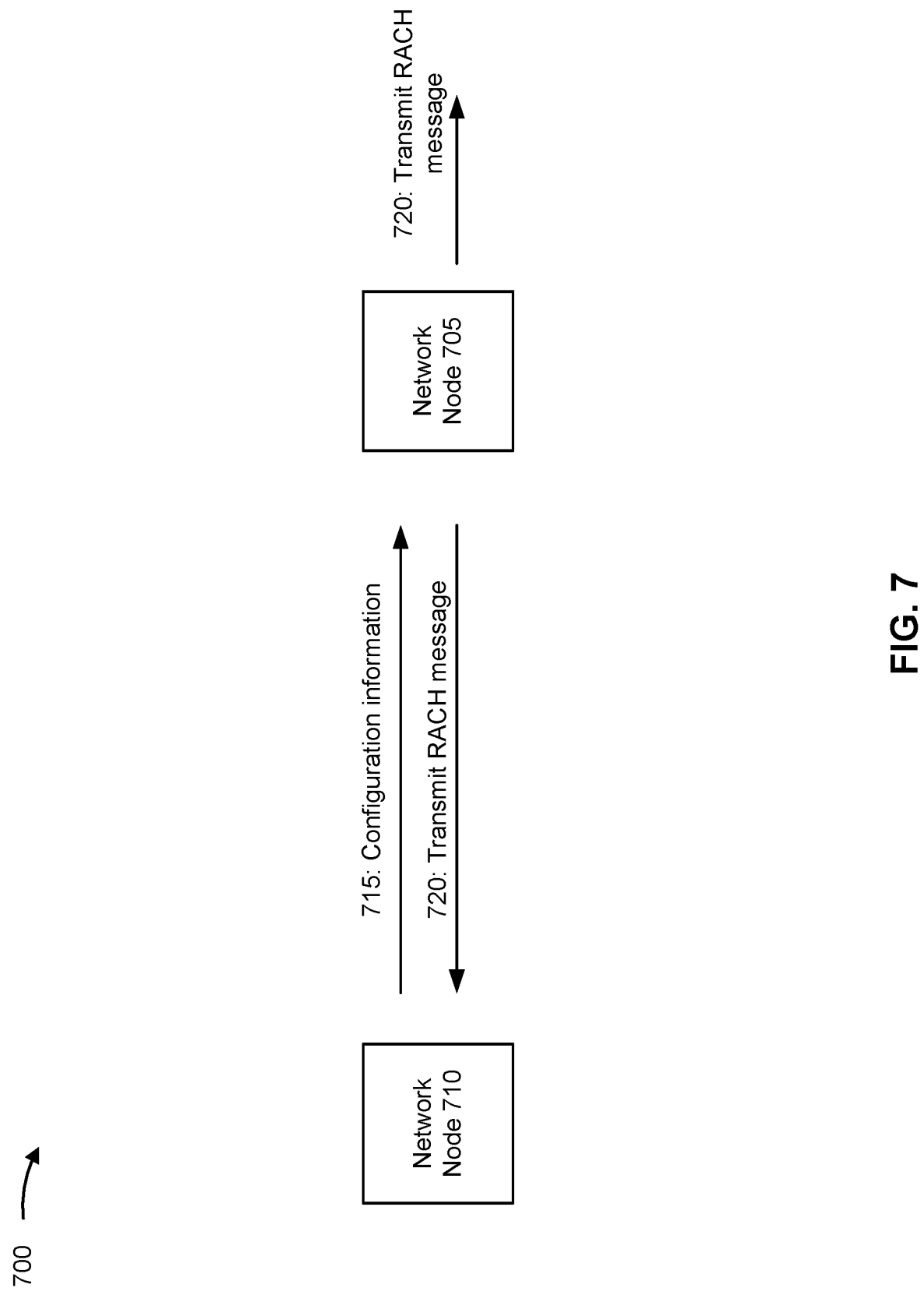
FIG. 7 is a diagram illustrating an example associated with full duplex random access channel communication, in accordance with the present disclosure.

FIG. 7 is a diagram illustrating an example 700 associated with full duplex random access channel communication, in accordance with the present disclosure. As shown in FIG. 7, example 700 includes communication between a network node 705 and a network node 710. In some aspects, network node 705 and network node 710 may be a UE 120 and a base station 110, respectively, a DU and a central unit (CU), respectively, or another set of devices at least one of which includes an FD or ED capability. In some aspects, network node 705 and network node 710 may be included in a wireless network, such as wireless network 100.

As further shown in FIG. 7, and by reference number 715, network node 705 may receive configuration information from network node 710. For example, network node 705 may receive information (e.g., a system information message, such as an RMSI message) configuring a fixed timing offset that is to be applied for transmitting a RACH preamble. In this case, network node 705 may apply the fixed timing offset (e.g., a positive or negative offset) to N_TAoffset to identify a timing for transmitting a RACH preamble.

In some aspects, network node 705 may apply the timing offset to a particular set of ROs. For example, when network node 705 is configured with multiple sets of RACH configurations (e.g., a set of RACH configurations for ROs for HD RACH or a set of RACH configurations for ROs for FD RACH, among other examples), network node 705 may apply an offset value to a particular set of RACH configurations. In this case, for example, the timing offset may include a first offset value that network node 705 may apply to a first set of RACH configurations (e.g., HD RACH configurations) and a second offset value that network node 705 may apply to a second set of RACH configurations (e.g., FD RACH configurations). Additionally, or alternatively, network node 705 may receive a single timing offset value and may apply the single timing offset value to a subset of RACH configurations based at least in part on a default association. For example, network node 705 may apply the single timing offset value to FD RACH configurations and use another default timing offset value (e.g., that is not included in the configuration information, such as a default value of 0) for other RACH configurations (e.g., HD RACH configurations, baseline RACH configurations, or legacy RACH configurations, among other examples).

In some aspects, different timing offset values may be applicable to different ROs. For example, network node 705 may apply a first timing offset in the configuration information to a first set of ROs of a first type and a second timing offset in the configuration information to a second set of ROs of a second type (e.g., the timing offsets may be beam-dependent). In this case, network node 705 may identify an association of timing offsets to sets of ROs based at least in part on an association of timing offsets to SSBs. For example, network node 705 may receive information identifying a first association of timing offsets to SSBs and a second association of SSBs to sets of ROs, and may apply timing offsets to sets of ROs based at least in part on the first association and the second association. In some aspects, network node 705 may derive an implicit set of ROs to which to apply a timing offset. For example, a first group of ROs may overlap with downlink or bidirection (BD) symbols, and network node 705 may associate the first group of ROs as a set of ROs for FD RACH. Similarly, ROs overlapping with configured downlink resources (e.g., SSB resources or PDCCH resources) may be associated into a set of ROs for FD RACH. In this case, network node 705 may identify a timing offset explicitly indicated for FD RACH ROs, and may apply the timing offset to the implicitly derived set of FD RACH ROs.

In some aspects, network node 705 may receive configuration information indicating an association of SSBs to sets of ROs. For example, network node 705 may receive one or more SSB bitmaps that indicate which SSBs are associated with each set of ROs. In this case, network node 705 may receive a first SSB bitmap to identify which SSBs are associated with FD ROs and a second SSB bitmap to identify which SSBs are associated with HD ROs. Additionally, or alternatively, network node 705 may implicitly derive the SSBs associated with HD ROs (e.g., based at least in part on the SSBs that are associated with FD ROs or a default configuration, among other examples). In some aspects, a size of the SSB bitmap may be based at least in part on a quantity of SSBs. For example, the size of the SSB bitmap may be equal to a maximum quantity of SSBs (L_max) or a quantity of actually transmitted SSBs.

As further shown in FIG. 7, and by reference number 720, network node 705 may transmit a RACH message. For example, network node 705 may transmit a RACH message in accordance with the configuration message received from network node 710. In some aspects, network node 705 may transmit to network node 710 or to another network node (not shown), among other examples. In some aspects, network node 705 may transmit a RACH preamble using a timing based at least in part on a received timing offset. For example, network node 705 may determine that the RACH preamble is associated with a particular subset of ROs, and may use a timing offset (e.g., applied to N_TAoffset) associated with the particular subset of ROs (and another timing offset for another RACH preamble transmission using another subset of ROs). Additionally, or alternatively, network node 705 may transmit on an RO based at least in part on an association with an SSB. For example, network node 705 may determine that the RO is included in a particular subset of ROs associated with one or more SSBs, and may transmit in the RO based at least in part on the association with the one or more SSBs (and may transmit in another RO of another subset of ROs based at least in part on another association with another one or more SSBs).

As indicated above, FIG. 7 is provided as an example. Other examples may differ from what is described with respect to FIG. 7.

Figure 8:
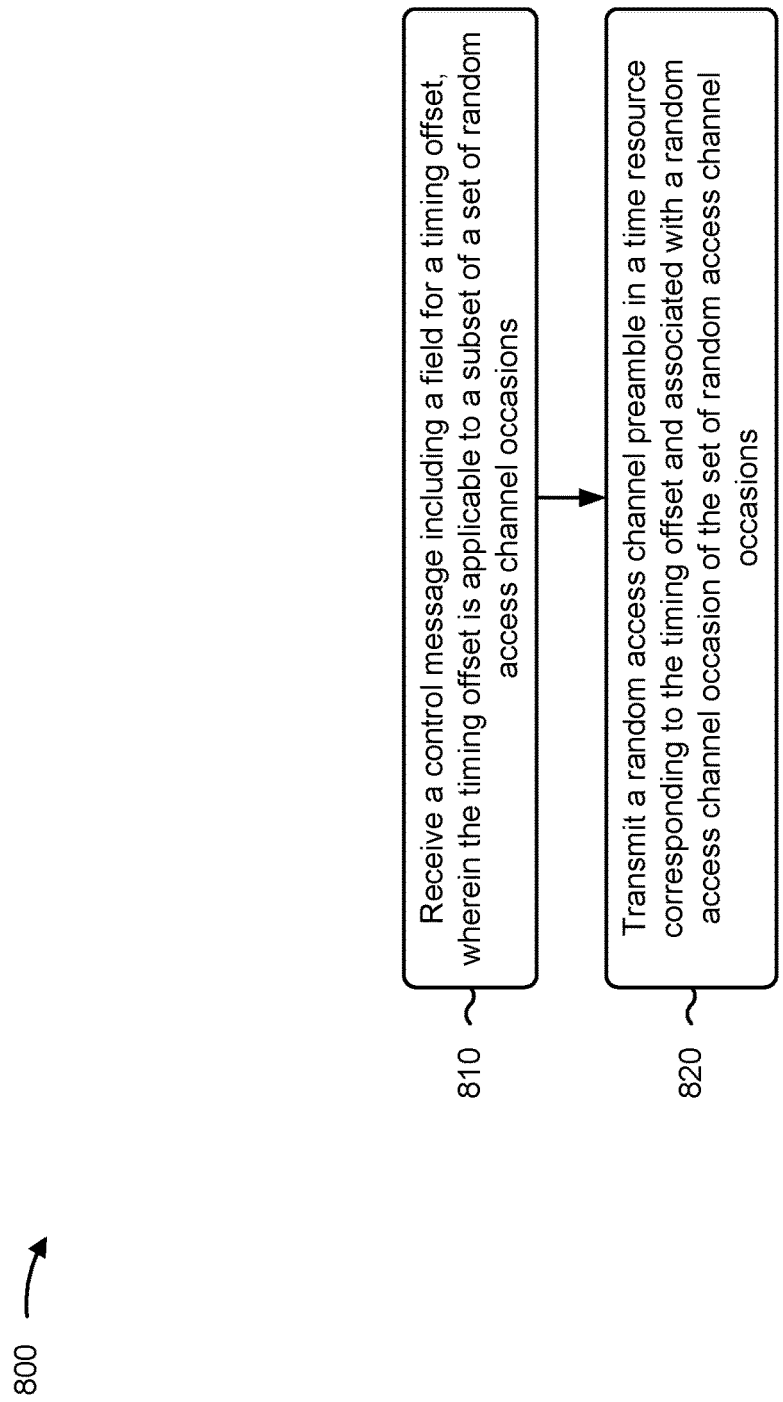
FIGS. 8-9 are diagrams illustrating example processes associated with full duplex random access channel communication, in accordance with the present disclosure.

FIG. 8 is a diagram illustrating an example process 800 performed, for example, by a network node, in accordance with the present disclosure. Example process 800 is an example where the network node (e.g., UE 120 or network node 705) performs operations associated with full duplex random access channel communication.

As shown in FIG. 8, in some aspects, process 800 may include receiving a control message including a field for a timing offset, wherein the timing offset is applicable to a subset of a set of random access channel occasions (block 810). For example, the network node (e.g., using communication manager 140 and/or reception component 1002, depicted in FIG. 10) may receive a control message including a field for a timing offset, wherein the timing offset is applicable to a subset of a set of random access channel occasions, as described above.

As further shown in FIG. 8, in some aspects, process 800 may include transmitting a random access channel preamble in a time resource corresponding to the timing offset and associated with a random access channel occasion of the set of random access channel occasions (block 820). For example, the network node (e.g., using communication manager 140 and/or transmission component 1004, depicted in FIG. 10) may transmit a random access channel preamble in a time resource corresponding to the timing offset and associated with a random access channel occasion of the set of random access channel occasions, as described above.

Process 800 may include additional aspects, such as any single aspect or any combination of aspects described below and/or in connection with one or more other processes described elsewhere herein.

In a first aspect, the control message is at least one of a system information message, a UE-specific message, or a group-specific message.

In a second aspect, alone or in combination with the first aspect, the timing offset is a positive timing offset.

In a third aspect, alone or in combination with one or more of the first and second aspects, the timing offset is a negative timing offset.

In a fourth aspect, alone or in combination with one or more of the first through third aspects, the time resource is based at least in part on a timing advance value.

In a fifth aspect, alone or in combination with one or more of the first through fourth aspects, the control message includes a first timing offset that corresponds to a first type of random access channel configuration and a second timing offset that corresponds to a second type of random access channel configuration, and the timing offset for the random access channel preamble is based at least in part on whether the random access channel preamble corresponds to the first type of random access channel configuration or the second type of random access channel configuration.

In a sixth aspect, alone or in combination with one or more of the first through fifth aspects, the timing offset for the random access channel preamble is based at least in part on whether the subset of the set of random access channel occasions corresponds to the first type of random access channel configuration or the second type of random access channel configuration.

In a seventh aspect, alone or in combination with one or more of the first through sixth aspects, the control message includes a single timing offset that is applicable to a plurality of types of random access channel configurations and corresponding random access channel occasions.

In an eighth aspect, alone or in combination with one or more of the first through seventh aspects, the subset of the set of random access channel occasions corresponds to a first type of random access channel configuration of the plurality of types of random access channel configurations and corresponding random access channel occasions, and the timing offset is applicable to another subset of the set of random access channel occasions corresponding to a second type of random access channel configuration of the plurality of types of random access channel configurations and corresponding random access channel occasions.

In a ninth aspect, alone or in combination with one or more of the first through eighth aspects, the network node is configured to use a default timing offset value when the field does not include the timing offset and, for a particular type of random access channel configuration, the field does not include the timing offset.

In a tenth aspect, alone or in combination with one or more of the first through ninth aspects, the field includes a first timing offset for a first random access channel occasion and a second timing offset for a second random access channel occasion.

In an eleventh aspect, alone or in combination with one or more of the first through tenth aspects, the timing offset is associated with a synchronization signal block.

In a twelfth aspect, alone or in combination with one or more of the first through eleventh aspects, a set of random access channel occasions is implicitly defined based at least in part on a characteristic of the set of random access channel occasions, and the timing offset is an explicit indicator applicable to at least one of the set of random access channel occasions.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
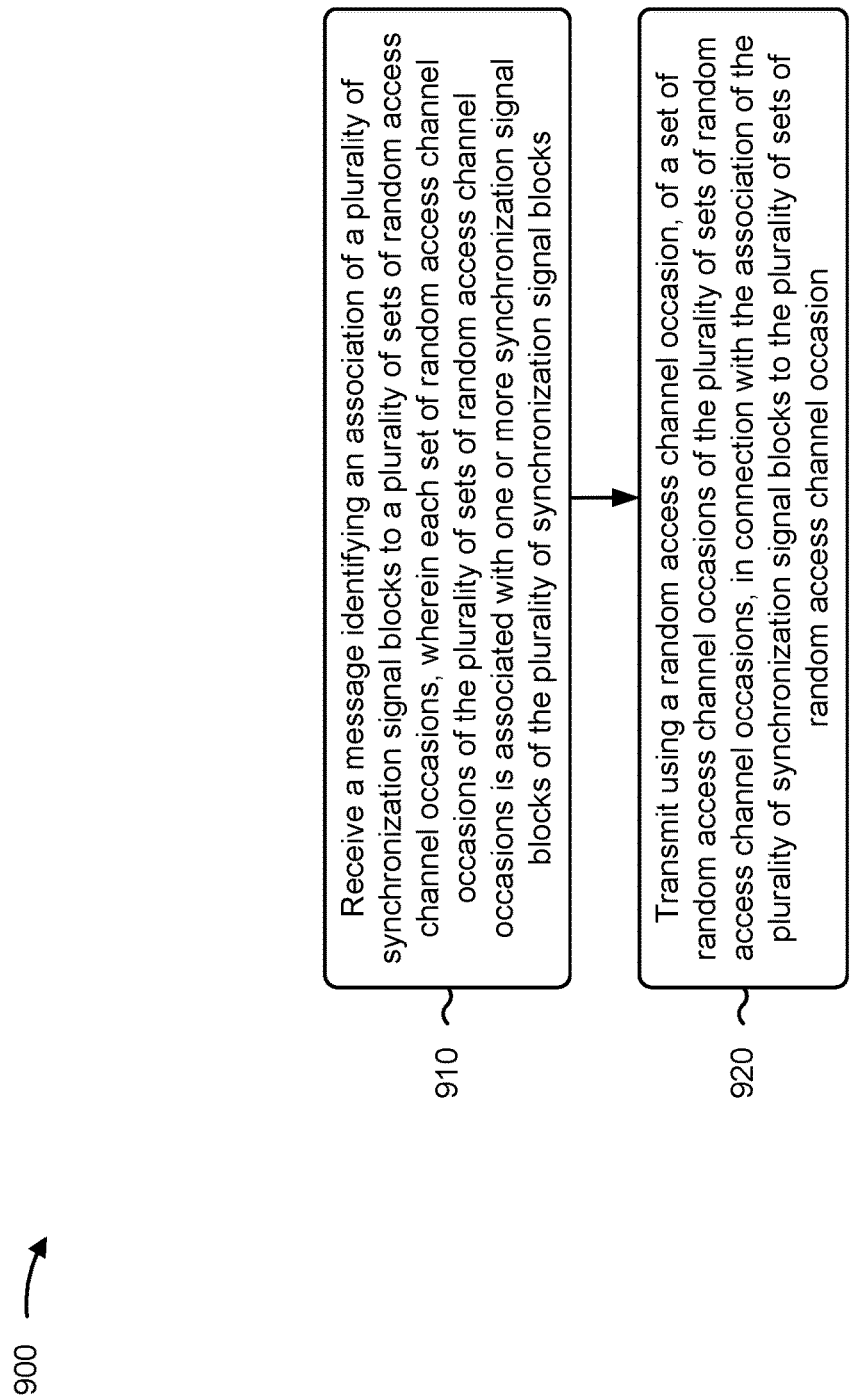

FIG. 9 is a diagram illustrating an example process 900 performed, for example, by a network node, in accordance with the present disclosure. Example process 900 is an example where the network node (e.g., UE 120 or network node 705) performs operations associated with full duplex random access channel communication.

As shown in FIG. 9, in some aspects, process 900 may include receiving a message identifying an association of a plurality of synchronization signal blocks to a plurality of sets of random access channel occasions, wherein each set of random access channel occasions of the plurality of sets of random access channel occasions is associated with one or more synchronization signal blocks of the plurality of synchronization signal blocks (block 910). For example, the network node (e.g., using communication manager 140 and/or reception component 1002, depicted in FIG. 10) may receive a message identifying an association of a plurality of synchronization signal blocks to a plurality of sets of random access channel occasions, wherein each set of random access channel occasions of the plurality of sets of random access channel occasions is associated with one or more synchronization signal blocks of the plurality of synchronization signal blocks, as described above.

As further shown in FIG. 9, in some aspects, process 900 may include transmitting using a random access channel occasion, of a set of random access channel occasions of the plurality of sets of random access channel occasions, in connection with the association of the plurality of synchronization signal blocks to the plurality of sets of random access channel occasion (block 920). For example, the network node (e.g., using communication manager 140 and/or transmission component 1004, depicted in FIG. 10)

may transmit using a random access channel occasion, of a set of random access channel occasions of the plurality of sets of random access channel occasions, in connection with the association of the plurality of synchronization signal blocks to the plurality of sets of random access channel occasion, as described above.

Process 900 may include additional aspects, such as any single aspect or any combination of aspects described below and/or in connection with one or more other processes described elsewhere herein.

In a first aspect, the message includes a bitmap identifying the association.

In a second aspect, alone or in combination with the first aspect, the message includes a bitmap specific to one or more full duplex random access channel occasions.

In a third aspect, alone or in combination with one or more of the first and second aspects, a size of a bitmap of the message is based at least in part on a maximum quantity of synchronization signal blocks or a quantity of transmitted synchronization signal blocks.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
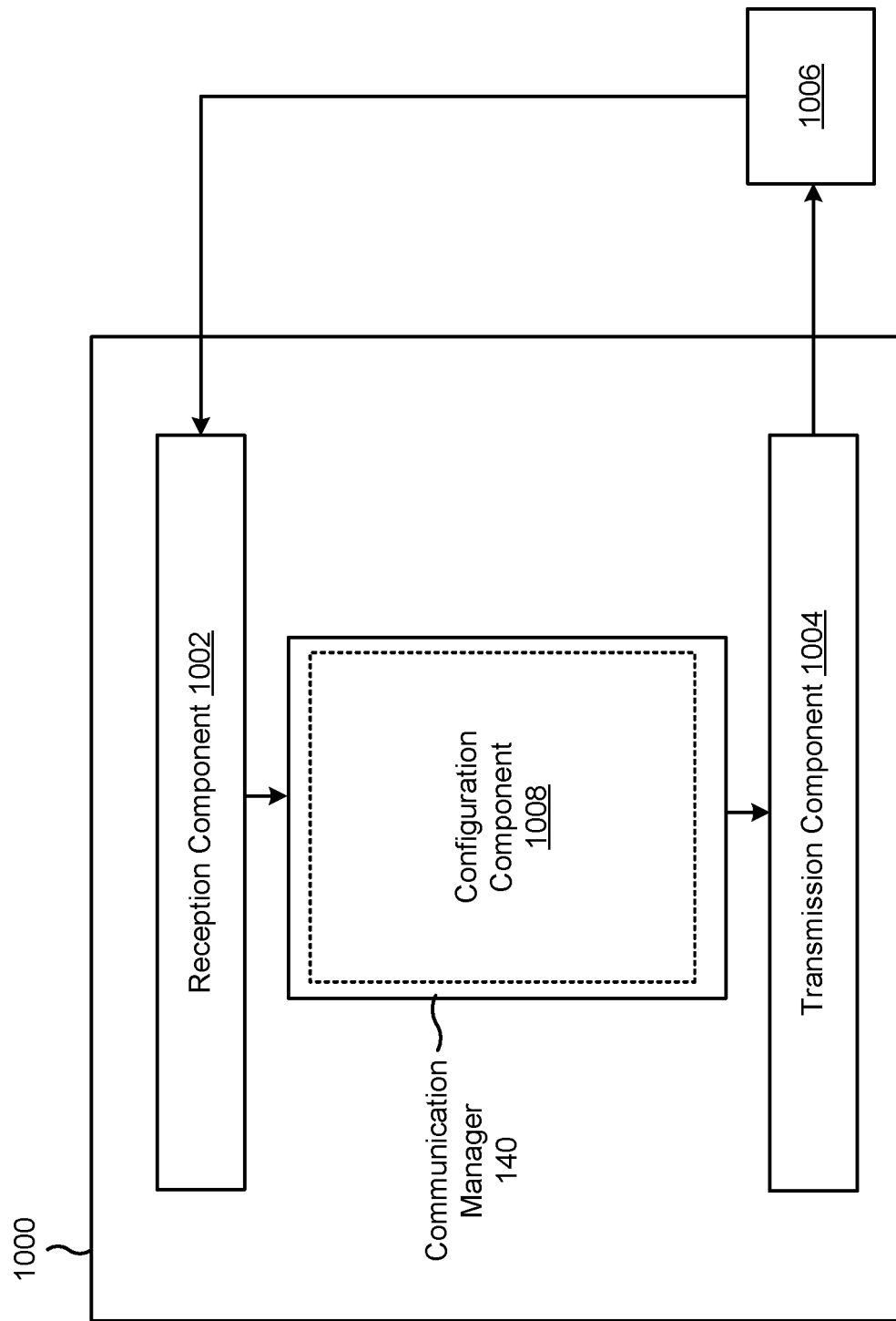
FIG. 10 is a diagram of an example apparatus for wireless communication, in accordance with the present disclosure.

FIG. 10 is a diagram of an example apparatus 1000 for wireless communication. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a configuration component 1008, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The reception component 1002 may receive a control message including a field for a timing offset, wherein the timing offset is applicable to a subset of a set of random access channel occasions. The transmission component 1004 may transmit a random access channel preamble in a time resource corresponding to the timing offset and associated with a random access channel occasion of the set of random access channel occasions. The reception component 1002 may receive a message identifying an association of a plurality of synchronization signal blocks to a plurality of sets of random access channel occasions, wherein each set of random access channel occasions of the plurality of sets of random access channel occasions is associated with one or more synchronization signal blocks of the plurality of synchronization signal blocks. The transmission component 1004 may transmit using a random access channel occasion, of a set of random access channel occasions of the plurality of sets of random access channel occasions, in connection with the association of the plurality of synchronization signal blocks to the plurality of sets of random access channel occasion. The configuration component 1008 may configure a random access channel procedure based at least in part on received configuration information, such as a received control message with a timing offset or a received message with information identifying an association between synchronization signal blocks and sets of random access channel occasions.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a network node, comprising: receiving a control message including a field for a timing offset, wherein the timing offset is applicable to a subset of a set of random access channel occasions; and transmitting a random access channel preamble in a time resource corresponding to the timing offset and associated with a random access channel occasion of the set of random access channel occasions.

Aspect 2: The method of Aspect 1, wherein the control message is at least one of: a system information message, a UE-specific message, or a group-specific message.

Aspect 3: The method of any of Aspects 1 to 2, wherein the timing offset is a positive timing offset.

Aspect 4: The method of any of Aspects 1 to 3, wherein the timing offset is a negative timing offset.

Aspect 5: The method of any of Aspects 1 to 4, wherein the time resource is based at least in part on a timing advance value.

Aspect 6: The method of any of Aspects 1 to 5, wherein the control message includes a first timing offset that corresponds to a first type of random access channel configuration and a second timing offset that corresponds to a second type of random access channel configuration; and wherein the timing offset for the random access channel preamble is based at least in part on whether the random access channel preamble corresponds to the first type of random access channel configuration or the second type of random access channel configuration.

Aspect 7: The method of any of Aspects 1 to 6, wherein the timing offset for the random access channel preamble is based at least in part on whether the subset of the set of random access channel occasions corresponds to the first type of random access channel configuration or the second type of random access channel configuration.

Aspect 8: The method of any of Aspects 1 to 7, wherein the control message includes a single timing offset that is applicable to a plurality of types of random access channel configurations and corresponding random access channel occasions.

Aspect 9: The method of Aspect 8, wherein the subset of the set of random access channel occasions corresponds to a first type of random access channel configuration of the plurality of types of random access channel configurations and corresponding random access channel occasions; and wherein the timing offset is applicable to another subset of the set of random access channel occasions corresponding to a second type of random access channel configuration of the plurality of types of random access channel configurations and corresponding random access channel occasions.

Aspect 10: The method of any of Aspects 1 to 9, wherein the network node is configured to use a default timing offset value when the field does not include the timing offset.

Aspect 11: The method of any of Aspects 1 to 10, wherein, for a particular type of random access channel configuration, the field does not include the timing offset.

Aspect 12: The method of any of Aspects 1 to 11, wherein the field includes a first timing offset for a first random access channel occasion and a second timing offset for a second random access channel occasion.

Aspect 13: The method of any of Aspects 1 to 12, wherein the timing offset is associated with a synchronization signal block.

Aspect 14: The method of any of Aspects 1 to 13, wherein a set of random access channel occasions is implicitly defined based at least in part on a characteristic of the set of random access channel occasions, and wherein the timing offset is an explicit indicator applicable to at least one of the set of random access channel occasions.

Aspect 15: A method of wireless communication performed by a network node, comprising: receiving a message identifying an association of a plurality of synchronization signal blocks to a plurality of sets of random access channel occasions, wherein each set of random access channel occasions of the plurality of sets of random access channel occasions is associated with one or more synchronization signal blocks of the plurality of synchronization signal blocks; and transmitting using a random access channel occasion, of a set of random access channel occasions of the plurality of sets of random access channel occasions, in connection with the association of the plurality of synchronization signal blocks to the plurality of sets of random access channel occasion.

Aspect 16: The method of Aspect 15, wherein the message includes a bitmap identifying the association.

Aspect 17: The method of any of Aspects 15 to 16, wherein the message includes a bitmap specific to one or more full duplex random access channel occasions.

Aspect 18: The method of any of Aspects 15 to 17, wherein a size of a bitmap of the message is based at least in part on a maximum quantity of synchronization signal blocks or a quantity of transmitted synchronization signal blocks.

Aspect 19: An apparatus for wireless communication at a device, comprising a processor; memory coupled with the processor; and instructions stored in the memory and executable by the processor to cause the apparatus to perform the method of one or more of Aspects 1-14.

Aspect 20: A device for wireless communication, comprising a memory and one or more processors coupled to the memory, the one or more processors configured to perform the method of one or more of Aspects 1-14.

Aspect 21: An apparatus for wireless communication, comprising at least one means for performing the method of one or more of Aspects 1-14.

Aspect 22: A non-transitory computer-readable medium storing code for wireless communication, the code comprising instructions executable by a processor to perform the method of one or more of Aspects 1-14.

Aspect 23: A non-transitory computer-readable medium storing a set of instructions for wireless communication, the set of instructions comprising one or more instructions that, when executed by one or more processors of a device, cause the device to perform the method of one or more of Aspects 1-14.

Aspect 24: An apparatus for wireless communication at a device, comprising a processor; memory coupled with the processor; and instructions stored in the memory and executable by the processor to cause the apparatus to perform the method of one or more of Aspects 15-18.

Aspect 25: A device for wireless communication, comprising a memory and one or more processors coupled to the memory, the one or more processors configured to perform the method of one or more of Aspects 15-18.

Aspect 26: An apparatus for wireless communication, comprising at least one means for performing the method of one or more of Aspects 15-18.

Aspect 27: A non-transitory computer-readable medium storing code for wireless communication, the code comprising instructions executable by a processor to perform the method of one or more of Aspects 15-18.

Aspect 28: A non-transitory computer-readable medium storing a set of instructions for wireless communication, the set of instructions comprising one or more instructions that, when executed by one or more processors of a device, cause the device to perform the method of one or more of Aspects 15-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a +b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:
   one or more memories; and
   one or more processors, coupled to the one or more memories, configured to:
      receive a control message including a field for a timing offset, the timing offset being applicable to a subset of a set of random access channel occasions, the set of random access channel occasions including multiple subsets, each subset corresponding to a random access channel configuration, wherein the control message includes a first timing offset corresponding to a first type of random access channel configuration and a second timing offset corresponding to a second type of random access channel configuration; and
      transmit a random access channel preamble in a time resource, the time resource being determined in accordance with the timing offset, the time resource being associated with a random access channel occasion of the subset of random access channel occasions or another subset of the set of random access channel occasions, wherein the timing offset corresponds to: the first timing offset when the random access channel preamble corresponds to the first type of random access channel configuration, or the second timing offset when the random access channel preamble corresponds to the second type of random access channel configuration.

2. The network node of claim 1, wherein the control message is at least one of:
   a system information message,
   a UE-specific message, or
   a group-specific message.

3. The network node of claim 1, wherein the timing offset is a positive timing offset.

4. The network node of claim 1, wherein the timing offset is a negative timing offset.

5. The network node of claim 1, wherein the time resource is based at least in part on a timing advance value.

6. The network node of claim 1, wherein the timing offset for the random access channel preamble is based at least in part on whether the subset of the set of random access channel occasions corresponds to the first type of random access channel configuration or the second type of random access channel configuration.

7. The network node of claim 1, wherein the first timing offset or the second timing offset is applicable to a plurality of types of random access channel configurations.

8. The network node of claim 7, wherein the subset of the set of random access channel occasions corresponds to the first type of random access channel configuration of the plurality of types of random access channel configurations; and
   wherein a single timing offset is applicable to the other subset of the set of random access channel occasions corresponding to the second type of random access channel configuration of the plurality of types of random access channel configurations.

9. The network node of claim 1, wherein the network node is configured to use a default timing offset value when the field does not include the timing offset.

10. The network node of claim 1, wherein, for a particular type of random access channel configuration, the field does not include the timing offset.

11. The network node of claim 1, wherein the field includes the first timing offset for a first random access channel occasion and the second timing offset for a second random access channel occasion.

12. The network node of claim 1, wherein the timing offset is associated with a synchronization signal block.

13. The network node of claim 1, wherein a set of random access channel occasions is implicitly defined based at least in part on a characteristic of the set of random access channel occasions, and
wherein the timing offset is an explicit indicator applicable to at least one random access channel occasion of the set of random access channel occasions.

14. A method of wireless communication performed by a network node, comprising:
receiving a control message including a field for a timing offset, the timing offset being applicable to a subset of a set of random access channel occasions, the set of random access channel occasions including multiple subsets, each subset corresponding to a random access channel configuration, wherein the control message includes a first timing offset corresponding to a first type of random access channel configuration and a second timing offset corresponding to a second type of random access channel configuration; and
transmitting a random access channel preamble in a time resource, the time resource being determined in accordance with the timing offset, the time resource being associated with a random access channel occasion of the subset of random access channel occasions or another subset of the set of random access channel occasions, wherein the timing offset corresponds to: the first timing offset when the random access channel preamble corresponds to the first type of random access channel configuration, the second timing offset when the random access channel preamble corresponds to the second type of random access channel configuration.

15. The method of claim 14, wherein the control message is at least one of:
a system information message,
a UE-specific message, or
a group-specific message.

16. The method of claim 14, wherein the timing offset is a positive timing offset.

17. The method of claim 14, wherein the timing offset is a negative timing offset.

18. The method of claim 14, wherein the time resource is based at least in part on a timing advance value.

19. The method of claim 14, wherein the timing offset for the random access channel preamble is based at least in part on whether the subset of the set of random access channel occasions corresponds to the first type of random access channel configuration or the second type of random access channel configuration.

20. The method of claim 14, wherein the first timing offset or the second timing offset is applicable to a plurality of types of random access channel configurations.

21. The method of claim 20, wherein the subset of the set of random access channel occasions corresponds to the first type of random access channel configuration of the plurality of types of random access channel configurations; and
wherein a single timing offset is applicable to the other subset of the set of random access channel occasions corresponding to the second type of random access channel configuration of the plurality of types of random access channel configurations.

22. The method of claim 14, wherein the network node is configured to use a default timing offset value when the field does not include the timing offset.

23. A non-transitory computer-readable medium that stores a set of instructions for wireless communication that, when executed by one or more processors of a network node, cause the network node to at least:
receive a control message including a field for a timing offset, the timing offset being applicable to a subset of a set of random access channel occasions, the set of random access channel occasions including multiple subsets, each subset corresponding to a random access channel configuration, wherein the control message includes a first timing offset corresponding to a first type of random access channel configuration and a second timing offset corresponding to a second type of random access channel configuration; and
transmit a random access channel preamble in a time resource, the time resource being determined in accordance with the timing offset, the time resource being associated with a random access channel occasion of the subset of random access channel occasions or another subset of the set of random access channel occasions, wherein the timing offset corresponds to: the first timing offset when the random access channel preamble corresponds to the first type of random access channel configuration, or the second timing offset when the random access channel preamble corresponds to the second type of random access channel configuration.

24. The non-transitory computer-readable medium of claim 23, wherein the timing offset is associated with a synchronization signal block, or wherein the timing offset is a positive timing offset.

25. The non-transitory computer-readable medium of claim 24, wherein a set of random access channel occasions is implicitly defined based at least in part on a characteristic of the set of random access channel occasions, and
wherein the timing offset is an explicit indicator applicable to at least one resource access channel occasion of the set of random access channel occasions.

26. An apparatus for wireless communication, the apparatus comprising:
means for receiving a control message including a field for a timing offset, the timing offset being applicable to a subset of a set of random access channel occasions, the set of random access channel occasions including multiple subsets, each subset corresponding to a random access channel configuration, wherein the control message includes a first timing offset corresponding to a first type of random access channel configuration and a second timing offset corresponding to a second type of random access channel configuration; and
means for transmitting a random access channel preamble in a time resource, the time resource being determined in accordance with the timing offset, the time resource being associated with a random access channel occasion of the subset of random access channel occasions or another subset of the set of random access channel occasions, wherein the timing offset corresponds to: the first timing offset when the random access channel preamble corresponds to the first type of random access channel configuration, or the second timing offset when the random access channel preamble corresponds to the second type of random access channel configuration.

27. The apparatus of claim 26, wherein the timing offset is associated with a synchronization signal block, or wherein the timing offset is a negative timing offset.

28. The apparatus of claim 27, wherein a set of random access channel occasions is implicitly defined based at least in part on a characteristic of the set of random access channel occasions, and
   wherein the timing offset is an explicit indicator applicable to at least one random access channel occasion of the set of random access channel occasions.

29. The apparatus of claim 26, wherein the time resource is based at least in part on a timing advance value.

30. The apparatus of claim 26, wherein the apparatus is configured to use a default timing offset value when the field does not include the timing offset.

* * * * *